US005534879A

United States Patent [19]
Braun et al.

[11] Patent Number: 5,534,879
[45] Date of Patent: Jul. 9, 1996

[54] ELECTRICAL CONNECTOR FOR VEHICLE WINDOW

[75] Inventors: Jörg Braun, Reken; Peter Paulus, Munster, both of Germany

[73] Assignee: Flachglas Aktiengesellschaft, Furth, Germany

[21] Appl. No.: 187,300

[22] Filed: Jan. 25, 1994

[30]   Foreign Application Priority Data

Jan. 27, 1993 [DE] Germany .............................. 43 02 139.5

[51] Int. Cl.⁶ ............................................... H01Q 1/32
[52] U.S. Cl. ........................ 343/713; 343/711; 343/906; 439/916
[58] Field of Search ..................... 343/713, 712, 343/704, 711, 906; 439/67, 916; H01Q 1/32

[56]   References Cited

U.S. PATENT DOCUMENTS 3,615,986  10/1971  Dickason et al. ...................... 343/712
5,307,076   4/1994  Murakami et al. ..................... 343/713

Primary Examiner—Hoanganh Le
Attorney, Agent, or Firm—Herbert Dubno

[57]   ABSTRACT

A connecting element for a glass sheet of multi-pane glass, in particular of laminated glass, which incorporates at least an outer pane, an inner pane and a laminating element joining the panes to one another, as well as an electrical arrangement located between the panes, the connecting element incorporating at least a metal foil strip being at least partly insulated, being connectable to the electrical arrangement and bondable to the outside of the inner pane. To make it possible that the connection to the electrical arrangement can already take place prior to the laminating process and to provide assurance for the connecting element against peeling off during manipulation of the finished glass sheet the inner section of the metal foil strip connectable to the electrical arrangement extends between the inner pane and the outer pane. The outer section of the metal foil strip bondable to the outside of the inner pane incorporates an area with a greater thickness than that of the inner section and forms a single piece with the inner section. At least on fold location is provided between the outer section and the inner section in the region of the edges of the inner pane.

19 Claims, 4 Drawing Sheets

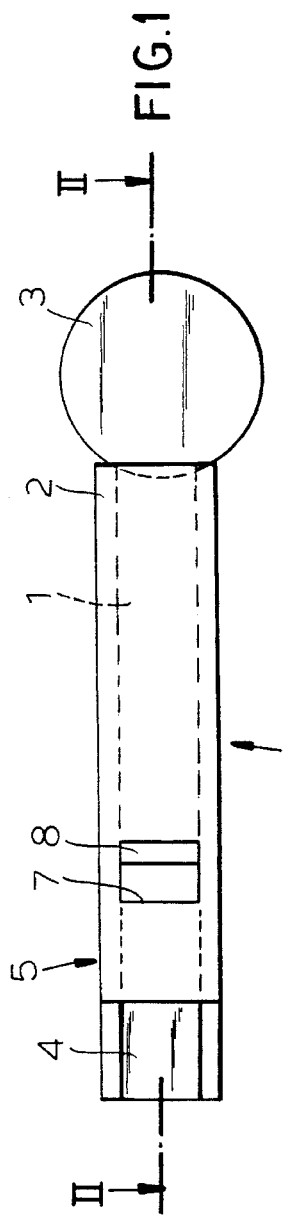
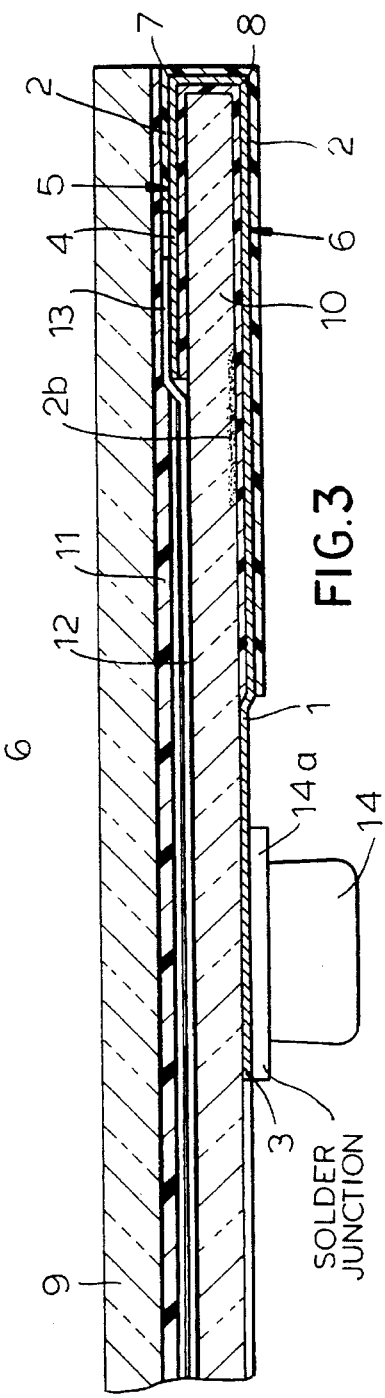
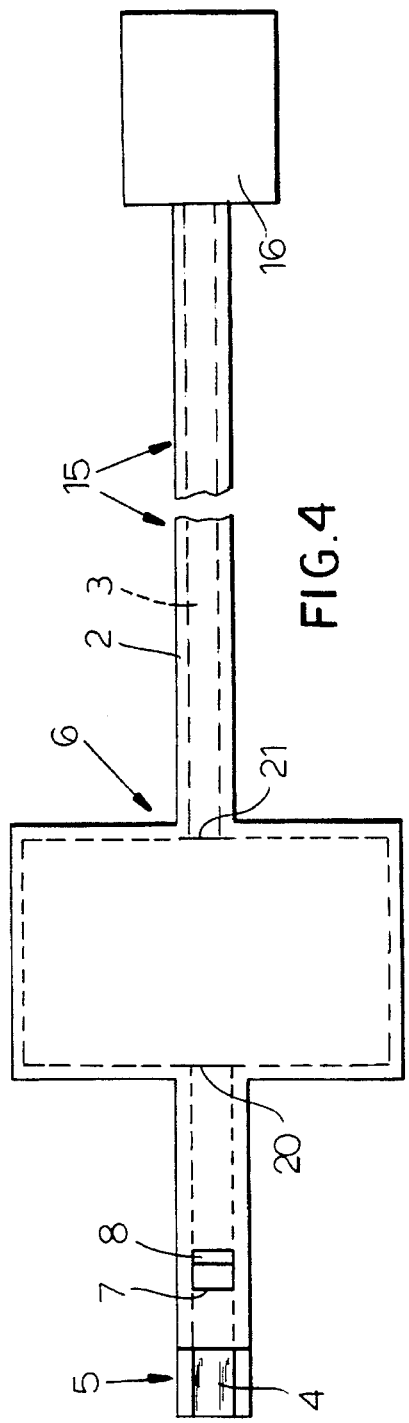

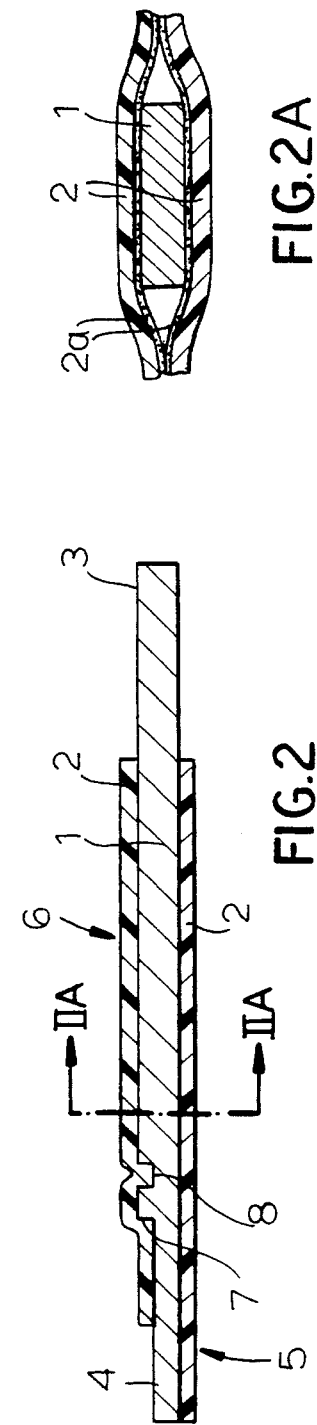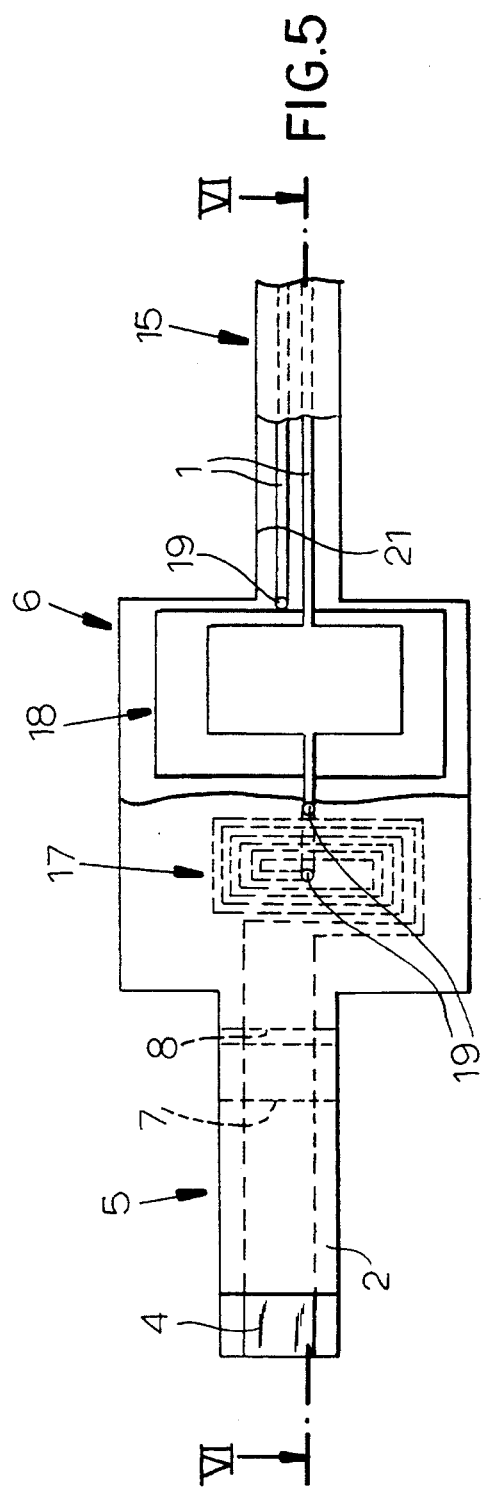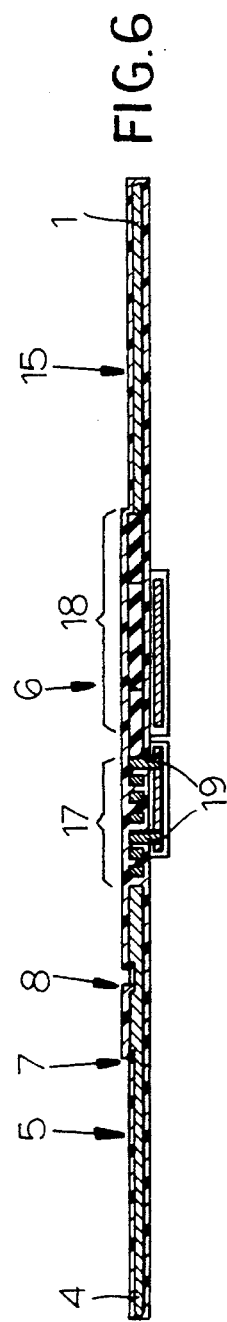

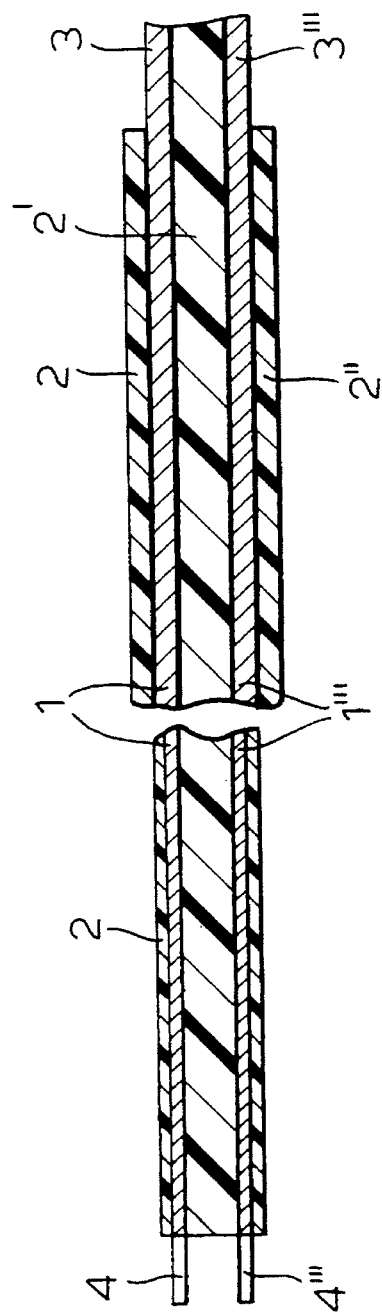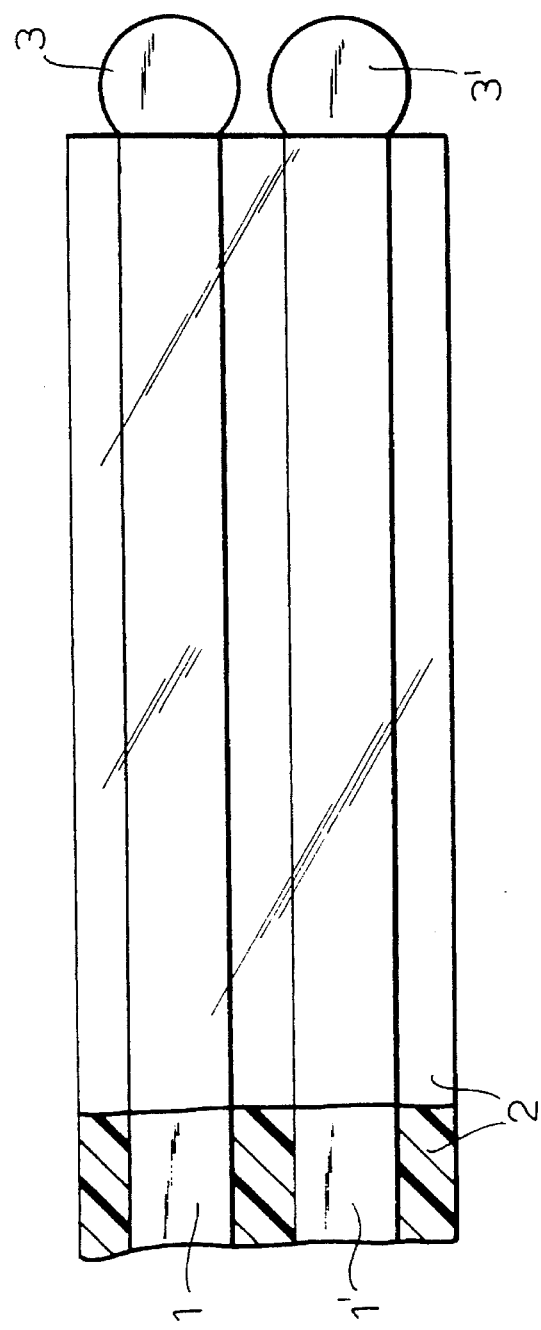

ELECTRICAL CONNECTOR FOR VEHICLE WINDOW

FIELD OF THE INVENTION

Our present invention relates to an electrical connector for a vehicle window and, more particularly, to a connecting element for a vehicle window of multi-pane glass, in particular of laminated glass, which has at least an outer pane, an inner pane and a laminating element joining the two panes to one another, as well as an electrical arrangement located between the panes, the connector incorporating at least one metal foil strip which is at least partly insulated, is connected to the electrical arrangement, and can be bonded to the outside of the inner pane.

The laminating element for the vehicle glass window, usually in the form of laminated safety glass, can be a thermoplastic laminating film or layer, the bond being established by means of thermal and compressive treatment of the laminate. The laminating element can also take the form of a cast resin layer or the like.

The invention relates primarily to laminated glass. The invention is also however applicable to double glazing, where the laminating element is formed by a spacing frame bonded to the panes which are spaced from one another in the vicinity of the pane edge, the double glazing incorporating an electrical arrangement in the inter-pane space or interspace.

The connecting element or connector is suitable particularly for use with vehicle glass sheets where the electrical arrangement is a wire or printed-on antenna element. It can also however be used for other electrical arrangements, such as linear heating element conductors, heating layers, alarm wires, sensors and the like.

BACKGROUND OF THE INVENTION

Laminated glass panes with antenna elements inserted between the panes, in particular embedded in the laminating layer, are known in a variety of forms. As a rule, the connecting element for the antenna elements is located on the outside of the inner pane (U.S Pat. No. 3,615,986). Connection of the connecting element to the antenna element takes place after manufacture of the bonding of the inner pane, laminating layer and outer pane. The inner pane incorporates an edge recess into which projects a connecting lug of the antenna element. This connecting lug is soldered to the connecting element and subsequently the edge recess is filled with an insulating compound. Because the edge recess accommodates the solder joint between the antenna element and the connecting element, the laminated glass pane can be inserted with a gasket consisting of an elastic profile frame in the body opening, as well as bonded in place by means of an installation adhesive, without the connecting element or the solder joint with the antenna element being a hindrance.

Connecting the antenna element to the connecting element and the subsequent sealing of the edge recess are labor-intensive. In addition there is the fact that the metal foil strip of the known connecting element is narrow and of minimal rigidity, so that the retaining forces at the inner pane are low and there is a risk that the metal foil strip will partly or wholly become detached from the inner pane during handling (packing, shipping, unpacking, installation) of the finished laminated glass pane.

In another construction (DE 34 02 518), the connecting element takes the form of a connecting cable whose braided wire conductor extends into an edge recess of the laminating layer and is there connected to the connecting lug of the antenna element. In this case as well, the edge recess must be filled or sealed with an insulating compound. With a connecting element of this nature, automatic application of a sealing profile or of an adhesive glazing bead to the edge of the vehicle glass window is practically impossible.

OBJECTS OF THE INVENTION

The principal object of the invention is to provide an improved connector where connection to the electrical arrangement can take place between the glass panes prior to bonding of the inner pane, laminating element and outer pane, and which will preclude peeling off during manipulation of the finished glass sheet.

Another object is to provide a connecting element which is utilizable without an edge recess in the inner pane and without subsequent sealing of joints.

Yet another object of the invention is to provide an improved window construction in which connection of external circuitry to internal electric circuit elements or arrangements within the window is facilitated.

SUMMARY OF THE INVENTION

These objects are attained by the invention in that the inner section of the metal foil strip connectable to the electrical arrangement extends between the inner pane and the outer pane. The outer section of the metal foil strip is bondable to the outside of the inner pane incorporating an area of greater thickness than that of the inner section and is formed in one piece with the inner section. At least one fold location is provided in the region of the edges of the inner pane between the outer section and the inner section.

This connecting element can be connected to the electrical arrangement before assembly of the components of the glass sheet. The end of the metal foil strip connectable to the electrical arrangement can incorporate a soldering surface to which the electrical arrangement is soldered in particular before completion of the laminated glass or double glazing pane. The joint is securely accommodated inside the finished glass sheet and need not be insulated subsequently.

The connecting element is passed around the border of the inner pane. The existence of at least one fold location in the area of the edges permits extremely intimate contact with the border of the inner pane, by virtue of which the risk of peeling off or becoming caught during handling of the glass sheet is significantly reduced. The metal foil strip incorporates preferably at least one thickness-reduced line of fold and/or one fold step as fold locations between its outer section and its inner section. By a thickness-reduced line of fold is meant a linear area of reduced thickness running nearly at a right angle to the longitudinal dimension of the metal foil strip. A fold step is a thickness change of the metal foil strip where the thickness decreases stepwise from the outer section to the inner section. Both measures advantageously permit provision for intimate, precise shaping of the connecting element around the edges of the inner pane and thus contribute to improving manipulation safety of the glass sheet provided with the connecting element. Another or additional alternative for provision of fold locations within the scope of the invention lies in at least one of the fold locations taking the form of an area of reduced width.

An edge recess in the inner pane need no longer be provided in a connecting element according to the invention. The area of increased thickness of the metal foil strip is bonded to the latter. The increased thickness makes it possible to improve the strain relief on the connecting element, facilitates handling of the connecting element and in addition provides the opportunity for further configurations. In particular, the metal foil strip can in the area of increased thickness possess about twice the thickness of the other areas, that is to say primarily in the area of the inner section of the connecting element extending between the panes.

The invention enables the inner section of the connecting element to be extremely thin without sacrificing safe manipulation. This avoids sealing or adhesion problems, such as occur with the state of the art, caused by inserting relatively thick connecting elements between the glass panes. In practice, the metal foil strip can, for example, have a thickness of approximately 200–250 μm in the area of increased thickness, while its thickness in the area of the inner section is only approximately 100–125 μm or less.

The metal foil strip can additionally incorporate an increase in width in its outer section, particularly in the area of increased thickness, the width in this area preferably being several times the width in the other areas. This measure increases the retention force attainable when bonding the connecting elements to the outside of the inner pane. Furthermore, it makes it possible to configure the widened area of the metal foil strip in the form of a printed circuit board and to provide it with soldered-on electrical components. In the case of another embodiment, the widened section of the metal foil strip can also be structured to form electronic components and/or printed circuits. An integrated structure of this type saves space and reduces cost and also permits an arrangement of circuits, in particular of an amplifier, close to the base of an antenna element forming the electrical arrangement. In this way, line losses are reduced and impedance matching problems are avoided.

The area of increased thickness can be adjoined in one piece form by a free end whose metal foil strip is connectable to a plug or a socket. This free end need not be bonded to the inner pane. Alternatively or supplementary thereto, the end of the outer section incorporates a widened locating surface on which a plug or a socket, in particular a press-stud connection, is fixed to form an electrically conductive connection. The locating surface should preferably be bonded to the outside of the inner pane, as a result of which positive, durable contact of the glass sheet provided with the connecting element is made possible after installation of the former.

In an especially preferred embodiment, the entire metal foil strip is in one piece, that is to say is configured without joints, such as soldered or welded joints, the thickness changes and/or width changes, the fold locations and—if present—the other structural features having been formed by etching and if necessary by stamping from a metal semi-finished product. Joints are always susceptible to malfunction and necessitate increased manufacturing expense. The invention therefore reduces susceptibility to malfunction and reduces the expense for manufacture and fitting of the connecting element. In the case of connecting elements for antenna elements, it is particularly important to have as few joints as possible, as the quality of the entire antenna system can be significantly influenced by the quality of any joints present.

To avoid damaging the thin metal foil strip and short-circuits with electrically conductive parts, such as for example the vehicle body, the metal foil strip is embedded as completely as possible in a sheath of tear-resistant and heat-resistant plastic, in particular a polyimide coated on the inside with adhesive. Heat resistance is important so that the plastic will withstand undamaged the temperatures occurring during the course of manufacture of a laminated glass pane and during soldering. Polyimide is also suitable for traversing of the adhesive in the case of double glazings, where ensuring permanent sealing presents a special problem. When embedding the metal foil strip in the plastic sheath, care should be exercised by means of suitable process control so that no air pockets are formed, as otherwise problems may occur during further processing of the glass sheet provided with the connecting element, in particular during the laminating process.

Of course, the connecting element can also incorporate several metal foil strips running side-by-side or on different levels, for example for connection to several electrical arrangements, such as antenna elements and/or for formation of circuits or amplifiers.

In particular, the invention permits provision of a vehicle glass sheet with an antenna element where the metal foil strip of the connecting element according to the invention and the antenna element itself are configured as a one-piece component. In this case, the entire arrangement of antenna conductors and connectors is prefabricated, the metal foil strip merging seamlessly into the antenna conductors. To facilitate insertion of the entire arrangement between the glass panes, the metal foil strip and the antenna conductors, apart from soldering surfaces, is fully embedded in a plastic sheath. The antenna sheath is preferably made of transparent or translucent plastic so as to impair vision through the glass sheet as little as possible.

More particularly, a vehicle window according to the invention can comprise:

an outer glass pane;

an inner glass pane;

a laminating element securing the panes together;

means for forming at least one electrical circuit element between the panes; and a connector for the electrical circuit element and including at least one metal foil strip, the metal foil strip comprising:

an elongated inner section extending between the panes from an edge portion of the window and secured to the electrical circuit element, an elongated outer section bonded to an outer surface of the inner pane and having at least an area of greater thickness than a thickness of the inner section, and at least one fold location folded about an edge of the inner pane at the edge portion and unitarily connected to the inner and the outer sections.

That window can utilize a connector for connecting an electric circuit element between two panes of the window to external circuitry, the connector comprising:

at least one metal foil strip, the metal foil strip comprising:

an elongated inner section adapted to extend between the panes from an edge portion of the window and to be secured to the electrical circuit element, an elongated outer section adapted to be bonded to an outer surface of one of the panes and having at least an area of greater thickness than a thickness of the inner section, and at least one fold location dimensioned to be folded about an edge of the one of the panes at the edge portion and unitarily connected to the inner and the outer sections.

BRIEF DESCRIPTION OF THE DRAWING

The above and other objects, features, and advantages will become more readily apparent from the following description, reference being made to the accompanying drawing in which:

FIG. 1 is a plan view of a connecting element according to the invention;

FIG. 2 is a section along line II—II of FIG. 1 through the connecting element;

FIG. 2A is a section along line IIA—IIA of FIG. 2;

FIG. 3 is a section through a laminated glass pane with antenna element and connecting element;

FIG. 4 is a view similar to FIG. 1 of another embodiment of the invention;

FIG. 5 is a view similar to FIG. 4 of a variant of that embodiment;

FIG. 6 is a section along line VI—VI of FIG. 5;

FIG. 9 is a sectional view illustrating a feature of the invention; and

FIG. 10 is a fragmentary plan view showing another feature.

SPECIFIC DESCRIPTION

Figure 7:
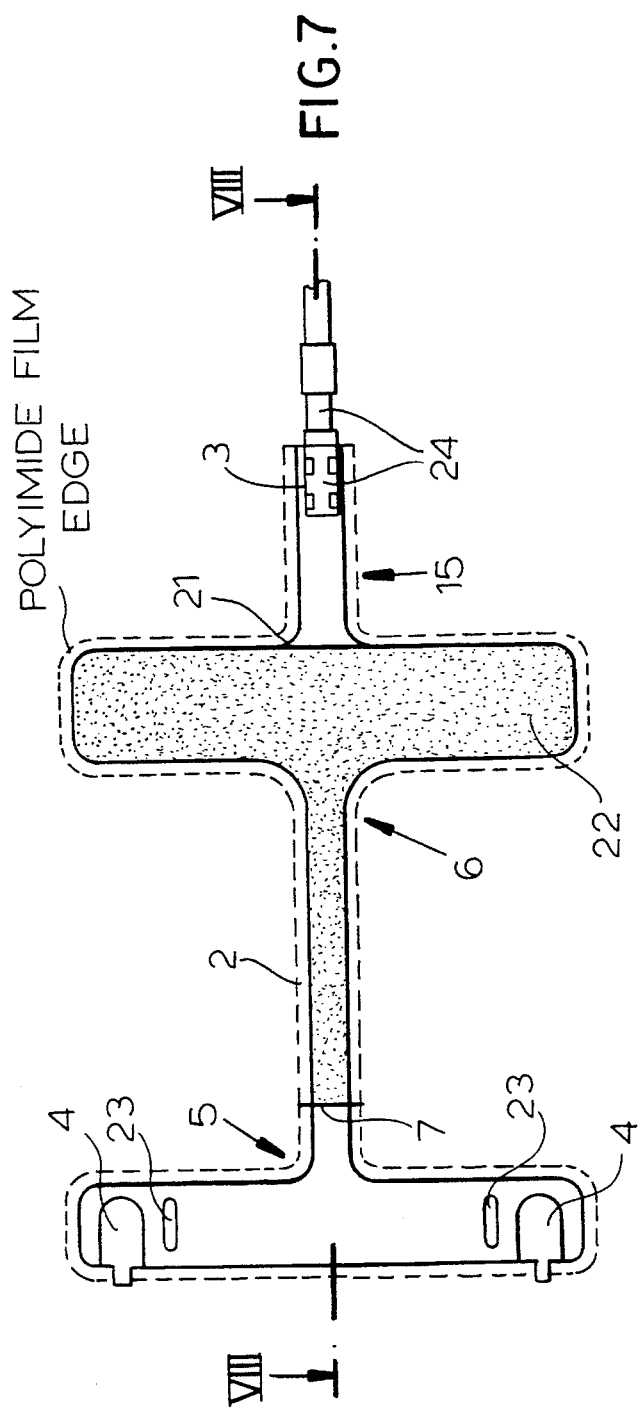
FIG. 7 is a view similar to FIG. 4 of a further variant thereof.

The connector for a glass window illustrated in FIGS. 1, 2 and 2A consists of a metal foil strip 1 of copper which is embedded almost completely, free from air bubbles, in a plastic sheath 2 consisting of two polyimide sheets coated with adhesive 2a on their inner surfaces. The metal foil strip 1 has the same width throughout, apart from a plastic-free locating surface 3 for a plug or a socket, in particular a press-stud connection. At the end opposite the locating surface 3, the metal foil strip 1 is exposed and incorporates there a soldering surface 4. The soldering surface 4 is preferably tinned like the locating surface 3. The inner section 5 of the metal foil strip 1 formed by the soldering surface 4 and a short section adjacent to it has a thickness of approximately 125 µm. The outer section 6 of the metal foil strip 1 adjoining the inner section 5, including the locating surface 3, has a thickness of approximately 250 µm. Between the inner section 5 and the outer section 6, there are two fold locations 7, 8 parallel to one another. These are a line of fold 8 extending across the metal foil strip 1 and a fold step 7 located closer to the inner section 5.

In the cross-sectional view of FIG. 2, the variation in thickness of the metal foil strip 1 according to the invention can clearly be seen. In the area of the inner section 5, the latter is of minimum thickness. In the area of the fold step 7, its thickness increases approximately twofold. In the area of the line of fold 8, its thickness is reduced linearly. Adjacent thereto, it remains constant over the entire outer section 6 as far as the locating surface 3.

The arrangement of the connecting element on a laminated glass pane is illustrated in FIG. 3. The laminated glass pane consists of an outer pane 9, an inner pane 10 and a lamination layer 11 with an antenna element 12 embedded in it which forms the electrical arrangement. The end of the metal foil strip 1 connectable to the end 13 of the antenna element 12, that is to say the inner section 5 with the soldering surface 4, extends between the inner pane 10 and the outer pane 9, the soldering surface 4 being connected to the end 13 of the antenna element 12. In detail, the arrangement is such that the two fold locations 7, 8, whose spacing corresponds to the thickness of the inner pane 10, rest on the edges of the inner pane 10, so that the metal foil strip is passed closely round the border of the inner pane 10. The outer section 6 of the metal foil strip 1 is adhesively bonded (by adhesive layer 2b) onto the outside of the inner pane 10 in the area of increased thickness. Its locating surface 3 bears a press-stud 14 (attached by a solder junction 14a) for subsequent connection to a continuing lead.

Before assembly of the components of the laminated glass pane, the connecting element is connected, for example by soldering, to the end 13 of the antenna element 12 and is attached in the manner described to the inner pane 10, so that neither during the subsequent manufacturing process of the laminated glass pane no during subsequent handling of the laminated glass pane, nor in particular during installation of the laminated glass pane in an opening in the vehicle body, is there any risk of the connecting element being detached wholly or partly from the laminated glass pane.

In the case of the embodiments illustrated in FIGS. 4 to 8, identical reference numbers denote identical parts. In the case of the connecting element illustrated in FIG. 4, the metal foil strip 1 of the outer section 6 has partly a width which is several times the width of the rest of the metal foil strip 1. As a result, adhesion in particular of the outer section 6 and thus of the connecting element on the outside of the inner pane 10 is improved, so that a longer free end 15, if necessary not attached to the inner pane 10, can also adjoin here, its end bearing a plug and socket connector 16 or the like. In the case of the embodiment illustrated in FIG. 4, the metal foil strip 1 has in the area of this free end 15 a thickness of approximately 125 µm, again corresponding to the inner section 5. The widened area of the outer section 6 is thicker than all other sections of the connecting element. Thickness changes occur at the fold locations 7, 8 and additionally in the area of the steps 21 and possibly 20.

The connecting element for an antenna illustrated in FIGS. 5 and 6 has a similar horizontal projection to that illustrated in FIG. 4. On the widened area of the outer section 6 which is thicker than the inner section 5, electronic elements, in the case of the embodiment illustrated, a coil 17 and capacitor 18 are formed. In the adjacent free end 15, there are two metal foil strips 1, one of which acts as an antenna connection and the other as ground connection.

As can be seen from the drawing which only represents a schematic sketch, in particular the widened and thickened area of the outer section 6 of the metal foil strip 1 is configured in the form of a printed circuit board and is provided with the electronic components illustrated or with additional ones. The metal foil strip 1, as can be seen particularly in FIG. 6, is configured on two levels, between which there is an insulating layer, for example of polyimide. The structured metal foil strips 1 located on the different levels are connected to one another at several points 19 in electrically conductive form. The thickness and width changes of the metal foil strip 1, the fold locations 7, 8 and the electronic structures have been produced preferably by etching and stamping of a copper semi-finished product strip of constant thickness. Irrespective of or in addition to this, it is also possible to solder electronic components onto the thickened or widened area of the outer section 6 of the metal foil strip 1, so that complete circuits or amplifiers are formed which are located close to the base of the antenna element 12.

Figure 8:
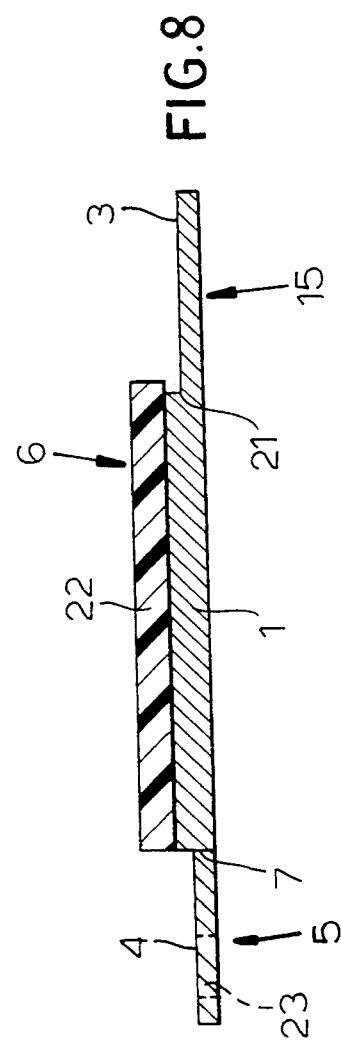
FIG. 8 is a section along line VIII—VIII of FIG. 7.

In FIGS. 7 and 8 a further embodiment of the connecting element according to the invention is illustrated. The metal foil strip 1 comprises an area of the outer section 6 which is thicker than inner section 5, and the area of which is additionally partly widened as compared to its original width. The area with a greater thickness is thereby formed as a T when viewed from above, as can be seen in FIG. 7. A fold step 7 is located between the inner section 5 and the outer section 6 permitting intimate contact of the connecting element to the border of the inner pane 10. A further step 21 is incorporated at the other end of the area of increased thickness. The insulating polyimide sheath 2 which is shown in FIG. 7 only is provided with a self-adhesive layer 22 usable to bond the outer section 6 to the inner pane 10. The connecting element comprises a completely insulated free end 15, to which is crimped a connecting line via a connector 24.

To allow for the connection of an AM antenna consisting of two parallel wires the inner section 5 of the connecting element takes the form of a T. The widened end of the inner section 5 incorporates two soldering surfaces 4 for the connection to the antenna wires. To reduce the heat load of the inner section 5 during soldering of the antenna wires to the soldering surfaces 4 holes 23 have been etched into the widened end near to the soldering surfaces 4 with the purpose of hindering heat transfer.

The metal foil strip 1 of the described embodiment has a thickness of about 100 μm at its inner section 5 and the free end 15 and a thickness of about 250 μm at the area of increased thickness of the outer section 6.

In FIG. 9 we have shown an embodiment of the invention in which several metal foil strips are provided on different levels separated by insulating interlayers.

In this embodiment, more particularly, the two metal foil strips 1 and 1''', shown only with respect to the inner and outer sections of reduced thickness and greater thickness, respectively, are separated by the insulating layer 2' which can also be a tear-resistant and heat-resistant plastic, such as a polyimide, the opposite surfaces of which have been coated with an adhesive to facilitate bonding to the metal strips 1 and 1'''. Within the window, the metal strips 1 and 1''' can have sections 4 and 4''' which can be soldered to internal circuit elements, whereas externally of the laminated window, the enlarged areas of the tabs 3 and 3''' can be provided with plug and socket members like the studs 14 previously described.

The outer heat-resistant plastic sheets 2 and 2'' can be bonded together and to the intermediate sheet 2' to form respective sheaths around the foil strips 1 and 1'''.

In the embodiment of FIG. 10, several metal foil strips, namely the two metal foil strips 1 and 1' have enlarged areas 3 and 3' which can receive studs such as the stud 14.

When reference is made here to a plug and socket connection, it will be understood that the reference is intended to mean that either the plug or the socket member can be provided upon the enlarged area 3, 3' or 3'''. The other member of the plug and socket connection, of course, can be connected to the external circuitry, e.g. a radio in the case where the internal circuit elements form an antenna, or the vehicle electric system, where internal circuit elements form a heater.

We claim:

1. A vehicle window, comprising:
   an outer glass pane;
   an inner glass pane;
   a laminating element securing said panes together; means for forming at least one electrical circuit element between said panes; and
   a connector for said electrical circuit element and including at least one metal foil strip, said metal foil strip comprising:
      an elongated inner section extending between said panes from an edge portion of the window and secured to said electrical circuit element,
      an elongated outer section forming a single piece with said inner section and bonded to an outer surface of said inner pane and having at least an area of greater thickness than a lesser thickness of said inner section, and
      at least one fold location folded about an edge of said inner pane at said edge portion and unitarily connected to said inner and said outer sections, said fold location being a linear junction between said greater thickness and said lesser thickness and disposed at said edge of said inner pane.

2. The window defined in claim 1 wherein said fold location is in the form of a fold step ensuring precise folding of said strip against said edge of said inner pane.

3. The window defined in claim 1 wherein said strip has a region of reduced width at said location.

4. The window defined in claim 1 wherein said inner section is formed with an end formed with a soldering surface and joined to said circuit element by a solder connection.

5. The window defined in claim 1 wherein said area of greater thickness has a thickness which is at least twice the thickness of said inner section.

6. The window defined in claim 1 wherein said outer section is part of at least one electronic circuit component.

7. The window defined in claim 1 wherein said outer section has a free end formed with a widened locating surface, said connector further comprising a plug-and-socket connection electrically conductively connected to said locating surface.

8. The window defined in claim 1 wherein said strip is formed in one piece with variations in thickness and width formed by etching or stamping from a metal workpiece.

9. The window defined in claim 1 wherein said connector further comprises:
   a tear-resistant, heat-resistant polyimide sheath fully enclosing said strip except for a connection end of said outer section and an end of said inner section at which said inner section is connected to said circuit element.

10. The window defined in claim 1 wherein said connector includes several metal foil strips are provided side by side or separated by insulating interlayers at different levels.

11. A vehicle window, comprising:
    an outer glass pane;
    an inner glass pane;
    a laminating element securing said panes together; means for forming at least one electrical circuit element between said panes; and
    a connector for said electrical circuit element and including at least one metal foil strip, said metal foil strip comprising:
       an elongated inner section extending between said panes from an edge portion of the window and secured to said electrical circuit element,
       an elongated outer section forming a single piece with said inner section and bonded to an outer surface of said inner pane and having at least an area of greater thickness than a thickness of said inner section,
       at least one fold location folded about an edge of said inner pane at said edge portion and unitarily connected to said inner and said outer sections, and a reduced-thickness fold line formed in said strip at said fold location.

12. A vehicle window, comprising:

an outer glass pane;

an inner glass pane;

a laminating element securing said panes together;

means for forming at least one electrical circuit element between said panes; and a connector for said electrical circuit element and including at least one metal foil strip, said metal foil strip comprising:

an elongated inner section extending between said panes from an edge portion of the window and secured to said electrical circuit element, an elongated outer section bonded to an outer surface of said inner pane and having at least an area of greater thickness than a thickness of said inner section, and at least one fold location folded about an edge of said inner pane at said edge portion and unitarily connected to said inner and said outer sections, said area of greater thickness also having a greater width than other regions of said strip.

13. A vehicle window, comprising:

an outer glass pane;

an inner glass pane;

a laminating element securing said panes together;

means for forming at least one electrical circuit element between said panes; and a connector for said electrical circuit element and including at least one metal foil strip, said metal foil strip comprising:

an elongated inner section extending between said panes from an edge portion of the window and secured to said electrical circuit element, an elongated outer section bonded to an outer surface of said inner pane and having at least an area of greater thickness than a lesser thickness of said inner section, and at least one fold location folded about an edge of said inner pane at said edge portion and unitarily connected to said inner and said outer sections, said fold location being a linear junction between said greater thickness and said lesser thickness and disposed at said edge of said inner pane, said area of greater thickness being at least in part formed by a printed circuit board with soldered-on electrical components.

14. A vehicle window, comprising:

an outer glass pane;

an inner glass pane;

a laminating element securing said panes together;

means for forming at least one electrical circuit element between said panes; and a connector for said electrical circuit element and including at least one metal foil strip, said metal foil strip comprising:

An elongated inner section extending between said panes from an edge portion of the window and secured to said electrical circuit element, an elongated outer section bonded to an outer surface of said inner pane and having at least an area of greater thickness than a lesser thickness of said inner section, and at least one fold location folded about an edge of said inner pane at said edge portion and unitarily connected to said inner and said outer sections, said fold location being a linear junction between said greater thickness and said lesser thickness and disposed at said edge of said inner pane, said outer section having a free end adjacent to and in one piece with said area of greater thickness and provided with a plug-and-socket connection.

15. A connector for connecting to an electrical circuit element between two panes of a laminated glass vehicle window, said connector comprising:

at least one metal foil strip, said metal foil strip comprising:

an elongated inner section adapted to extend between said panes from an edge portion of the window and to be secured to said electrical circuit element, an elongated outer section adapted to be bonded to an outer surface of one of said panes and having at least an area of greater thickness than a thickness of said inner section, at least one fold location dimensioned to be folded about an edge of said one of said panes at said edge portion and unitarily connected to said inner and said outer sections, and a sheath formed of two internally adhesive coated sheets of polyimide resin enclosing all of said strip except for an end of said inner section to be connected to said electrical circuit element and an end of said outer section adapted to be provided with a plug-and-socket connector.

16. The connector defined in claim 15 wherein said fold location is in the form of a fold step ensuring precise folding of said strip against said edge of said inner pane and said area is at least twice the thickness of said inner section.

17. The connector defined in claim 15, further comprising a reduced-thickness fold line formed in said strip at said fold location and said area is at least twice the thickness of said inner section.

18. The connector defined in claim 15 wherein said strip has a region of reduced width at said location.

19. The connector defined in claim 15 wherein said area of greater thickness also has a greater width than other regions of said strip.

* * * * *